US011082535B2

(12) United States Patent
Fowe

(10) Patent No.: US 11,082,535 B2
(45) Date of Patent: Aug. 3, 2021

(54) LOCATION ENABLED AUGMENTED REALITY (AR) SYSTEM AND METHOD FOR INTEROPERABILITY OF AR APPLICATIONS

(71) Applicant: HERE GLOBAL B.V., Eindhoven (NL)

(72) Inventor: James Fowe, Chicago, IL (US)

(73) Assignee: HERE Global B.V., Eindhoven (NL)

(*) Notice: Subject to any disclaimer, the term of this patent is extended or adjusted under 35 U.S.C. 154(b) by 116 days.

(21) Appl. No.: 16/228,162

(22) Filed: Dec. 20, 2018

(65) Prior Publication Data
US 2020/0204649 A1 Jun. 25, 2020

(51) Int. Cl.
*G06F 15/16* (2006.01)
*H04L 29/06* (2006.01)
(Continued)

(52) U.S. Cl.
CPC .............. *H04L 67/38* (2013.01); *H04L 67/18* (2013.01); *G06F 3/0482* (2013.01);
(Continued)

(58) Field of Classification Search
CPC ....... H04L 67/38; H04L 67/18; H04L 69/329; G06F 3/04815; G06F 3/0482; G06F 3/04845
(Continued)

(56) References Cited

U.S. PATENT DOCUMENTS 7,716,077 B1 * 5/2010 Mikurak ............... G06Q 10/06
705/7.12
7,813,822 B1 * 10/2010 Hoffberg .......... H04N 21/44222
700/94
(Continued)

FOREIGN PATENT DOCUMENTS

WO      2017066801 A1    4/2017

OTHER PUBLICATIONS

Lee et al., "Interoperable Augmented Web Browsing for Exploring Virtual Media in Real Space", Conference Paper, Published in:— Proceeding LOCWEB '09 Proceedings of the 2nd International Workshop on Location and the Web, Article No. 7, Jan. 2009, 4 pages.
(Continued)

*Primary Examiner* — Thu Ha T Nguyen
(74) *Attorney, Agent, or Firm* — Ditthavong, Steiner & Mlotkowski

(57) ABSTRACT

Various aspects of a location-enabled AR platform system and a method for interoperability of augmented reality (AR) applications are disclosed herein. In accordance with an embodiment, the location-enabled AR platform system may include a memory and a processor. The processor may be configured to provide a protocol for communication between a first AR application and a second AR application. The processor may be further configured to receive, from the first AR application, a first set of functionalities of a plurality of functionalities for exposure. The processor may be configured to provide an accessibility of the received first set of functionalities of the first AR application to the second AR application. The processor may be configured to control the second AR application to manipulate the at least one AR object in the AR content of the first AR application.

20 Claims, 6 Drawing Sheets

(51) Int. Cl.
*H04L 29/08* (2006.01)
*G06F 3/0481* (2013.01)
*G06F 3/0482* (2013.01)
*G06F 3/0484* (2013.01)

(52) U.S. Cl.
CPC ...... *G06F 3/04815* (2013.01); *G06F 3/04845* (2013.01); *H04L 69/329* (2013.01)

(58) Field of Classification Search
USPC .................................................. 709/204, 205
See application file for complete search history.

(56) References Cited

U.S. PATENT DOCUMENTS

| | | | | |
|---|---|---|---|---|
| 8,073,565 | B2* | 12/2011 | Johnson | H04M 3/42348 700/245 |
| 9,984,508 | B2* | 5/2018 | Mullins | G06T 19/20 |
| 10,361,802 | B1* | 7/2019 | Hoffberg-Borghesani | H04N 21/4755 |
| 10,895,913 | B1* | 1/2021 | Patel | G06F 3/014 |
| 2003/0229900 | A1* | 12/2003 | Reisman | H04N 21/42204 725/87 |
| 2004/0068574 | A1* | 4/2004 | Costa Requena | H04L 65/103 709/230 |
| 2010/0017728 | A1* | 1/2010 | Cho | G06F 3/013 715/757 |
| 2012/0069131 | A1* | 3/2012 | Abelow | G06Q 10/067 348/14.01 |
| 2015/0135206 | A1* | 5/2015 | Reisman | H04H 20/93 725/18 |
| 2015/0135214 | A1* | 5/2015 | Reisman | H04N 21/4113 725/37 |
| 2016/0343173 | A1* | 11/2016 | Mullins | G02B 27/0103 |
| 2018/0005440 | A1* | 1/2018 | Mullins | G06F 9/452 |
| 2018/0261011 | A1* | 9/2018 | Kollencheri Puthenveettil | G06F 3/011 |
| 2018/0308287 | A1* | 10/2018 | Daniels | G06T 19/006 |
| 2018/0322674 | A1* | 11/2018 | Du | G06T 11/60 |
| 2019/0025583 | A1* | 1/2019 | Mullins | G02B 27/0955 |
| 2019/0036726 | A1* | 1/2019 | Irving, Jr. | G06F 3/011 |
| 2019/0114061 | A1* | 4/2019 | Daniels | G06F 3/04815 |
| 2019/0138260 | A1* | 5/2019 | Rogers | G06F 3/1454 |
| 2020/0007556 | A1* | 1/2020 | Brebner | H04L 67/306 |
| 2020/0037043 | A1* | 1/2020 | Phillips | H04N 21/812 |
| 2020/0051448 | A1* | 2/2020 | Welch | G09B 5/02 |
| 2020/0064996 | A1* | 2/2020 | Giusti | G06F 3/017 |
| 2020/0128106 | A1* | 4/2020 | McCormack | G06N 20/20 |
| 2020/0170062 | A1* | 5/2020 | Yang | H04W 76/16 |
| 2020/0204649 | A1* | 6/2020 | Fowe | G06T 19/006 |
| 2020/0284883 | A1* | 9/2020 | Ferreira | G01S 7/4816 |
| 2020/0294401 | A1* | 9/2020 | Kerecsen | G05D 1/0287 |
| 2020/0348662 | A1* | 11/2020 | Cella | G05B 23/0286 |
| 2020/0389429 | A1* | 12/2020 | Shribman | H04L 63/164 |

OTHER PUBLICATIONS

Belimpasakis et al., "A Web Service Platform for Building Interoperable Augmented Reality Solutions", Dec. 10, 2010, pp. 1-24.
Ahn et al., "Webizing Mobile Augmented Reality Content", New Review of Hypermedia and Multimedia, Feb. 10, 2014, pp. 1-22.
The AREA Editor, "Advancing Toward Open and Interoperable Augmented Reality", AREA Blog, Nov. 8, 2015, retrieved from http://thearea.org/advancing-toward-open-and-interoperable-augmented-reality/, pp. 1-4.
Office Action for corresponding European Patent Application No. 19217987.-1224, dated Jun. 18, 2020, 12 pages.

* cited by examiner

LOCATION ENABLED AUGMENTED REALITY (AR) SYSTEM AND METHOD FOR INTEROPERABILITY OF AR APPLICATIONS

TECHNOLOGICAL FIELD

Various embodiments of the disclosure relate to a system and a method for augmented reality applications. More particularly, the various embodiments of the present disclosure relate to a system and a method to provide a platform for interoperability of augmented reality (AR) applications.

BACKGROUND

Augmented Reality (AR) refers to deploying virtual images over real-world objects. An overlay may be executed simultaneously with an input received from an input device, such as a camera and a smart glass. The virtual images may be superimposed over real-world objects to create an illusion that can effectively engage users in a virtual world. AR is an evolving technology with ever increasing AR applications in the market.

The existing AR applications may be monolithic as the AR applications may not be able to interact with each other through a platform or communication protocol. Further, in today's world, every object may be used as a sensor array that generates a constant stream of data. However, there are no platforms to use such data to create new insights and AR applications to leverage the AR technology. Thereby, such AR applications may not be robust and have limited user experience.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method are described to provide a platform for interoperability of augmented reality (AR) applications as shown in, and/or described in connection with, at least one of the figures, as set forth more completely in the claims.

Embodiments of the disclosure provide a location-enabled augmented reality (AR) platform system, comprising at least one memory configured to store instructions and at least one processor configured to execute the instructions to provide a protocol for communication between a first AR application and a second AR application, receive, from the first AR application, a first set of functionalities of a plurality of functionalities for exposure, based on the provided protocol, wherein the first set of functionalities includes data related to at least one AR object in AR content of the first AR application, provide an accessibility of the received first set of functionalities of the first AR application to the second AR application, and control the second AR application to manipulate the at least one AR object in the AR content of the first AR application, based on the accessibility of the received first set of functionalities, wherein the manipulation of the at least one AR object corresponds to change of an attribute value of the at least one AR object.

According to one embodiment of the disclosure, the at least one processor is further configured to control the second AR application to manipulate the at least one AR object in the AR content of the first AR application in real time or near real time.

According to one embodiment of the disclosure, the at least one processor is further configured to control the second AR application to share data related to the at least one AR object in the AR content of the first AR application.

According to one embodiment of the disclosure, the first set of functionalities includes data, functions and features related to the at least one AR object in the AR content of the first AR application.

According to one embodiment of the disclosure, the at least one processor is further configured to control the first AR application and the second AR application to share data, based on the protocol for communication between the first AR application and the second AR application.

According to one embodiment of the disclosure, the at least one processor is further configured to receive at least one query from the second AR application for exposed interface with the first AR application, based on the protocol for communication, and wherein the first set of functionalities of the first AR application is exposed for an interface with the second AR application.

According to one embodiment of the disclosure, the at least one processor is further configured to receive at least one query from the second AR application for communication policy with the first AR application, based on the protocol for communication.

According to one embodiment of the disclosure, the communication policy includes one or more of no data sharing, data only sharing, data with Application Program Interface (API) functions available, data exchange available, Advertisement display with application Program Interface (API).

According to one embodiment of the disclosure, the at least one processor is further configured to provide a current state of the first AR application to the second AR application based on the provided protocol for communication, wherein the current state of the first AR application comprises one of active state, sleep state, shutdown state, or authentication required state.

According to one embodiment of the disclosure, the at least one processor is further configured to provide a mode for data broadcast between the first AR application and the second AR application, based on the provided protocol for communication.

According to one embodiment of the disclosure, the at least one processor is further configured to authenticate an exchange of data between the first AR application and the second AR application, based on the provided protocol for communication.

According to one embodiment of the disclosure, the first AR application communicates directly with the second AR application via a cloud server, based on the authentication of the communication protocol.

According to one embodiment of the disclosure, the AR application comprises a mixed reality application that combines virtual reality and augmented reality.

Embodiments of the disclosure provide a method for providing a platform for interoperability of augmented reality (AR) applications. The method comprises the steps of providing a protocol for communication between a first AR application and a second AR application, receiving, from the first AR application, a first set of functionalities of a plurality of functionalities for exposure, based on the provided protocol, wherein the first set of functionalities includes data related to at least one AR object in AR content of the first AR application, providing an accessibility of the received first set of functionalities of the first AR application to the second AR application, and controlling the second AR application to manipulate the at least one AR object in the AR content of the first AR application, based on the accessibility of the received first set of functionalities, wherein the manipulation of the at least one AR object corresponds to change of an attribute value of the at least one AR object.

Embodiments of the disclosure provide a computer program product comprising at least one non-transitory computer-readable storage medium having stored thereon computer-executable program code instructions which when executed by a computer, cause the computer to carry out operations for providing a platform for interoperability of augmented reality (AR) applications. The operations comprise providing a protocol for communication between a first AR application and a second AR application, receiving, from the first AR application, a first set of functionalities of a plurality of functionalities for exposure, based on the provided protocol, wherein the first set of functionalities includes data related to at least one AR object in AR content of the first AR application, providing an accessibility of the received first set of functionalities of the first AR application to the second AR application, and controlling the second AR application to manipulate the at least one AR object in the AR content of the first AR application, based on the accessibility of the received first set of functionalities, wherein the manipulation of the at least one AR object corresponds to change of an attribute value of the at least one AR object.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

The embodiments of the invention are illustrated by way of example, and not by way of limitation, in the figures of the accompanying drawings in which.

DETAILED DESCRIPTION OF DRAWINGS

The following described implementations may be found in the disclosed system and method for augmented reality (AR) applications. Exemplary aspects of the disclosure may include a location-enabled AR platform system to provide a platform for interoperability of augmented reality (AR) applications. The location-enabled AR platform system may include a memory configured to store instructions and a processor configured to execute the instructions.

The location-enabled AR platform system may be configured to provide a protocol for communication between a first AR application and a second AR application. The first AR application and the second AR application may be installed in one client device. In accordance with an embodiment, the first AR application and the second AR application may be installed in different client devices, such as a first client device and a second client device.

The location-enabled AR platform system may be configured to receive, from the first AR application, a first set of functionalities of a plurality of functionalities for exposure. Such reception of the first set of functionalities may be based on the provided protocol. The first set of functionalities may include data related to one or more AR objects in AR content of the first AR application. The location-enabled AR platform system may be configured to provide an accessibility of the received first set of functionalities of the first AR application to the second AR application. The location-enabled AR platform system may be configured to control the second AR application to manipulate the one or more AR objects in the AR content of the first AR application. Such control of the second AR application may be based on the accessibility of the received first set of functionalities. The manipulation of the one or more AR objects may correspond to a change of an attribute value of the one or more AR objects.

The location-enabled AR platform system aids in interoperability of plurality of AR applications. As a result, the AR applications may provide a better user experience as compared to monolithic AR applications that may not interact with each other. Since the system may use online data, such as location data, the AR applications may interact with each other intelligently. The system may be configured to enable AR applications to share data, features and functions based on location data in real time or near real time. Therefore, the system may be a robust system. The system may also be used by the mixed reality applications and virtual reality applications.

Figure 1:
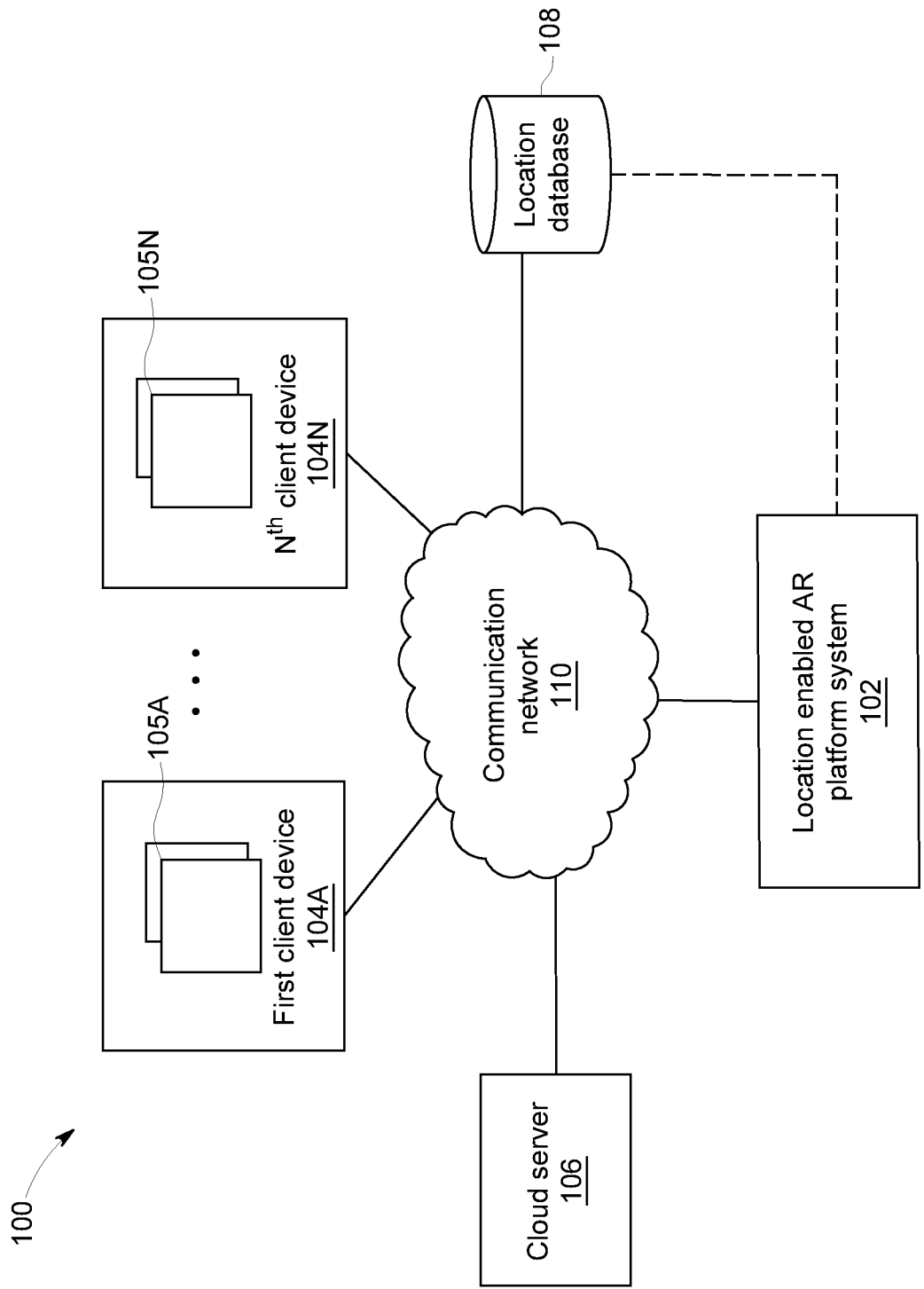
FIG. 1 is a block diagram that illustrates a network environment of a system to provide a platform for interoperability of augmented reality (AR) applications, in accordance with one embodiment.

FIG. 1 is a block diagram that illustrates a network environment of a system to provide a platform for interoperability of augmented reality (AR) applications, in accordance with an embodiment of the disclosure.

With reference to FIG. 1, there is shown a network environment 100 that may include a location-enabled AR platform system 102, a plurality of client devices 104A . . . 104N, an AR application 105A associated with the first client device 104A, an AR application 105N associated with the nth client device 104N, a cloud server 106, a location database 108 and a communication network 110. The location-enabled AR platform system 102 may be communicatively coupled to the plurality of client devices 104A-104N, via the communication network 110. Further, the location-enabled AR platform system 102 may be communicatively coupled to the cloud server 106, via the communication network 110. Also, the location-enabled AR platform system 102 may be communicatively coupled to the location based database 108, via the communication network 110. In accordance with an embodiment, the location-enabled AR platform system 102 may be directly coupled to the location database 108.

The location-enabled AR platform system 102 may comprise suitable logic, circuitry, interfaces, and code that may be configured to provide a platform for interoperability of augmented reality (AR) applications. The location-enabled AR platform system 102 may be configured to receive location data of an AR application, such as a first AR application from a client device on which the AR application may be installed and operated. The location-enabled AR platform system 102 may be configured to utilize data from systems (not shown in the FIG. 1) that ingests and processes location data on the location database 108 in real time or near real time. For example, an Augmented Reality smartphone application may require location data to position custom objects in space.

The location-enabled AR platform system 102 may be configured to provide a protocol for communication amongst plurality of AR applications (such as the first AR application and a second AR application) such that one AR application (e.g., the first AR application) may manipulate share and exchange data from another application (e.g., the second AR application) in real time or near real time. Examples of the AR platform system 102 may include, but are not limited to, an Application-Specific Integrated Circuit (ASIC), a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The plurality of client devices 104A-104N, such as a first client device 104A may comprise suitable logic, circuitry, interfaces, and code that may be configured to store one or more AR applications. The plurality of client devices 104A-104N may be communicatively coupled to the AR platform system 102, via the communication network 110. The plurality of client devices 104A-104N may be configured with sensors to collect various types of data, such as location data. Examples of the plurality of client devices 104A-104N may include, but are not limited to, mobile terminal, fixed terminal, or portable terminal including a mobile handset, station unit, device, multimedia tablet, Internet node, communicator, desktop computer, laptop computer, Personal Digital Assistants (PDAs), head-up display (HUD), augmented reality glasses, projectors, or any combination thereof. One or more users may be associated with the plurality of client devices 104A-104N. Further, a plurality of AR applications (such as, an AR application 105A) may be installed in the plurality of client devices (such as, the first client device 104A). An AR application 105N may be installed in the nth client device 104N.

The cloud server 106 may comprise suitable logic, circuitry, interfaces, and code that may be configured to provide augmented data for overlay to the plurality of AR applications on the plurality of client devices to render augmented reality on display screens of the plurality of client devices. In accordance with an embodiment, the cloud server 106 may be configured to interact with the plurality of AR applications directly, via the communication network 110. Such interaction may be based on an authentication received by the location-enabled AR platform system 102. The cloud server 106 may be configured to deliver services, such as global location cloud services to the location-enabled AR platform system 102. The cloud server 106 may be implemented using several technologies that are well known to those skilled in the art.

It may be appreciated that the cloud server illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The location database 108 may comprise suitable logic, circuitry, and interfaces that may be configured to receive queries from the location-enabled AR platform system 102 related to AR objects of AR content in the AR applications. The location data for AR applications may correspond to, but not limited to, car sensor data, information on street shop, history of a building, inventory for a store or any number of other data points in a city. Such information may be thought of as intelligence points in the real world. The location database 108 may be configured to provide a near real-time geospatial index of places, objects, entities, and knowledge over time. The location data may be collected from sources like GPS, cameras, ultrasonic, Light Detection and Ranging (LIDAR) and radar sensors in vehicles on a global scale. The location data for AR applications may also be gathered from geo-location data from websites, and public information from social media sites. Even something as simple as a connected thermostat or home automation IoT device may provide relevant and useful anonymized location information to a location database 108. The location database 108 may be configured to store updated and highly accurate view and understanding of the physical world. The data from the location database 108 may be ingested and processed by the location-enabled AR platform system 102 for AR applications.

The communication network 110 may comprise suitable logic, circuitry, and interfaces that may be configured to provide a plurality of network ports and a plurality of communication channels for transmission and reception of data, such as visual data, location data, map data and motion data. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The communication network 110 may include a medium through which the location-enabled AR platform system 102, and/or the cloud server 106 may communicate with each other. The communication network 110 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the communication network 110 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

A person with ordinary skill in the art will understand that the scope of the disclosure is not limited to implementation of the disclosed location-enabled AR platform system and method to provide a platform for interoperability of augmented reality (AR) applications, as shown. The AR applications, such as the first AR application and the second AR application may be installed in one client device or different client devices.

In operation, a user may operate two Augmented Reality (AR) applications in a client device, such as the first client device 104A. The Augmented Reality (AR) applications may deploy virtual image over real-world objects. An overlay of augmented data may be executed simultaneously with an input received from an image sensor, such as, image capture device of the first client device 104A or smart glasses. The AR applications where virtual images superimpose over real-world objects may create an illusion to engage users in a virtual world. With the growing traction towards Augmented Reality (AR) technology, the location-enabled AR platform system 102 may be configured to provide interoperability for the plurality of AR applications (such as the AR application 105A and the AR application 105N) to share, exchange or manipulate the data. The augmented reality visualizations may be activated based on the inputs, such as capturing a field of view from an image sensor associated with a client device, such as the first client device 104A.

The location-enabled AR platform system 102 may be configured to provide a protocol for communication amongst a plurality of AR applications, such as a first AR application and a second AR application. The protocol for communication may correspond to interoperability specification or an application program interface (API) for the plurality of AR applications, such as a first AR application and a second AR application. Based on the protocol for communication, the first AR application and the second AR application may be exposed to a set of functionalities from a plurality of functionalities of each other. Thereby, the first AR application and the second AR application may manipulate, share or exchange each other's data. In other words, interoperability specification or API may allow application providers to expose some features, functionalities or data of the AR applications to the location-enabled AR platform system 102, so that other AR applications may choose to consume the functionalities or data.

The location-enabled AR platform system 102 may be further configured to receive one or more queries from one of the plurality of AR applications, such as the second AR application, for exposed interface with the first AR application. The location-enabled AR platform system 102 may be configured to receive at least one query from the second AR application for communication policy with the first AR application, based on the protocol for communication. Communication policy may include one or more of no data sharing, data only sharing, data with Application Program Interface (API) functions available, data exchange available, Advertisement display with application Program Interface (API).

The location-enabled AR platform system 102 may be configured to authenticate an exchange of data between the first AR application and the second AR application, based on the protocol for communication. The first AR application may communicate directly with the second AR application via the cloud server 106, based on the authentication of the communication protocol by the location-enabled AR platform system 102. In accordance with an embodiment, the direct communication of the first AR application with the second AR application may be via the communication network 110.

The location-enabled AR platform system 102 may be configured to receive, from the first AR application, a first set of functionalities of a plurality of functionalities for exposure, based on the provided protocol. The first set of functionalities may include data related to at least one AR object in AR content of the first AR application. With the help of advanced AR technologies (e.g. adding computer vision and object recognition), information about the surrounding real world of a user may become interactive and digitally manipulative. The information about the environment and AR objects may be overlaid on the real world with the help of AR applications. The AR objects may be real or virtual objects. The location of AR objects may be retrieved from the location database 108 in real or near real time.

The location-enabled AR platform system 102 may be configured to provide an accessibility of the received first set of functionalities of the first AR application to the second AR application. The first set of functionalities of the first AR application may be exposed for an interface with the second AR application.

The location-enabled AR platform system 102 may be configured to control the second AR application to manipulate the one or more AR objects in the AR content of the first AR application, based on the accessibility of the received first set of functionalities, The manipulation of the at least one AR object of the first AR application may correspond to change of an attribute value of the at least one AR object. For example, various furniture objects (augmented objects) may be exposed by the first AR application for manipulation by the second AR application by change of their colors and shapes. Therefore, the location-enabled AR platform system 102 may be configured to control the second AR application to manipulate the one or more AR objects in the AR content of the first AR application in real time or near real time.

The location-enabled AR platform system 102 may be configured to control the second AR application to share data related to the at least one AR object in the AR content of the first AR application. Therefore, the location-enabled AR platform system 102 allows interoperable linkage amongst a plurality of AR applications such that a user may be able to view or access data (augmented objects) from one AR application provider to another AR application provider. The user experience may be enhanced by interaction of different AR applications as compared to AR applications that may be monolithic in nature.

Figure 2:
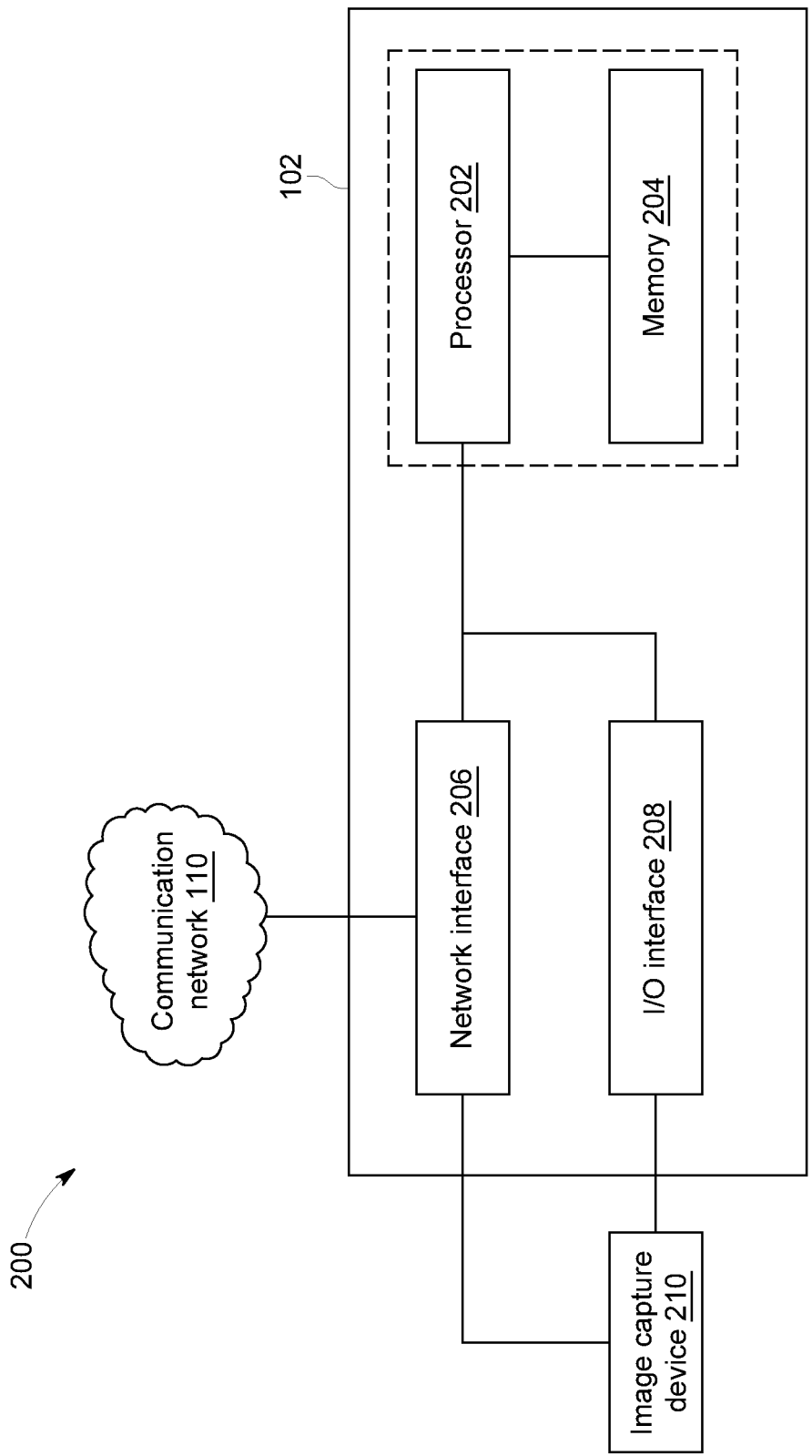
FIG. 2 is a diagram that illustrates a system to provide a platform for interoperability of augmented reality (AR) applications, in accordance with one embodiment.

FIG. 2 is a diagram that illustrates a system for providing a platform for interoperability of augmented reality (AR) applications. FIG. 2 is explained in conjunction with elements from FIG. 1. With reference to FIG. 2, there is shown a block diagram 200 of the AR platform system 102. The AR platform system 102 may include one or more processors, such as a processor 202, a memory 204, a network interface 206 and an input/output (I/O) interface 208. The I/O interface 208 may be connected to a plurality of image capture devices 210.

The processor 202 may comprise suitable logic, circuitry, and interfaces that may be configured to execute instructions stored in the memory 204. The processor 202 may be configured to utilize data from systems (not shown in the FIG. 1) that ingests and processes location data on the location database 108 in real time or near real time. The processor 202 may be configured to provide a protocol for communication amongst plurality of AR applications (such as the first AR application and a second AR application) such that one AR application (e.g., the first AR application) may manipulate share and exchange data from another application (e.g., the second AR application) in real time or near real time. Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The processor 202 may implement a number of processor technologies known in the art such as a machine learning model, a deep learning model, such as a recurrent neural network (RNN), a convolutional neural network (CNN), and a feed-forward neural network, or a Bayesian model. The processor 202 may be communicatively coupled to the network interface 206, the I/O interface 208, and the memory 204.

The memory 204 may comprise suitable logic, circuitry, and interfaces that may be configured to store a machine code and/or instructions executable by the processor 202. The memory 204 may store information including processor instructions for providing a platform for interoperability of augmented reality (AR) applications. The memory 1104 may be used by the processor 1102 to store temporary values during execution of processor instructions. The memory 204 may be configured to store protocol for communication between AR applications, such as a communication policy between the first AR application and the second AR application, data broadcast mode of an AR application in a client device. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the cloud server 106, the location database 108 and other systems and devices in the network environment 100, via the communication network 110. The network interface 206 may communicate with the one or more cloud servers, such as the cloud server 108, via the communication network 110 under the control of the processor 202. The network interface 202 may be implemented by use of known technologies to support wired or wireless communication of the AR platform system 102 with the communication network 110. Components of the network interface 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 208 may comprise suitable logic, circuitry, and interfaces that may be configured to operate as an I/O channel/interface between a user (e.g., a user of a smartphone where an AR application may be installed) and different operational components of the AR platform system 102 or other devices. The I/O interface 208 may facilitate an I/O device (for example, an I/O console) to receive an input (e.g., the plurality of images) and present an output based on the received input. The I/O interface 208 may include various input and output ports to connect various I/O devices that may communicate with different operational components of the AR platform system 102. Examples of the input devices may include, but is not limited to, a touch screen, a keyboard, a mouse, a joystick, a microphone, and an image-capture device. Examples of the output devices may include, but is not limited to, a display, a speaker, a haptic output device, or other sensory output devices. The operations performed by the processor 202 have been further described with reference to FIGS. 3A to 3C with exemplary scenarios.

Figure 3A:
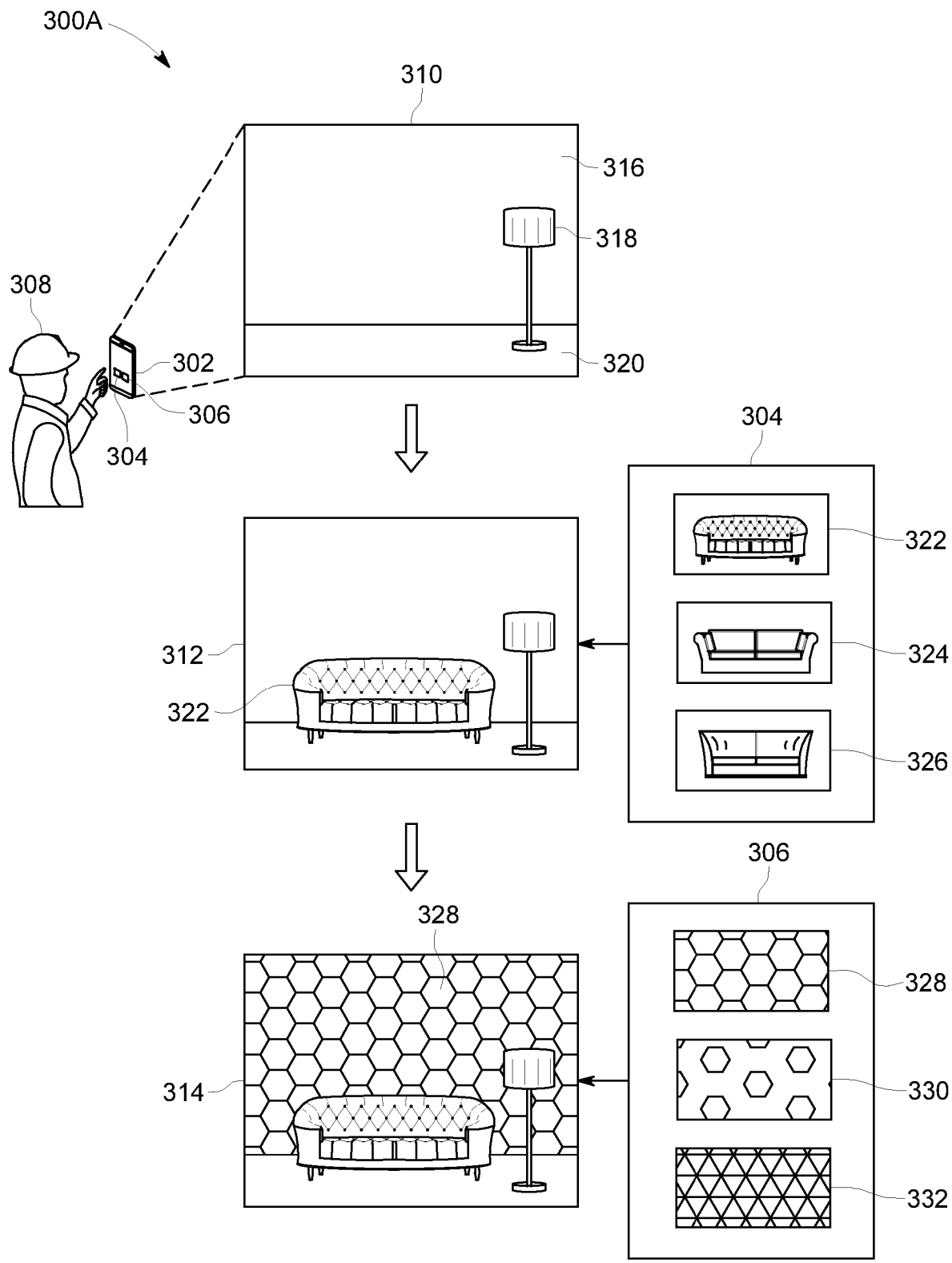
FIG. 3A illustrates a first exemplary scenario for implementation of the system and method to provide a platform for interoperability of augmented reality (AR) applications, in accordance with one embodiment.
Figure 3B:
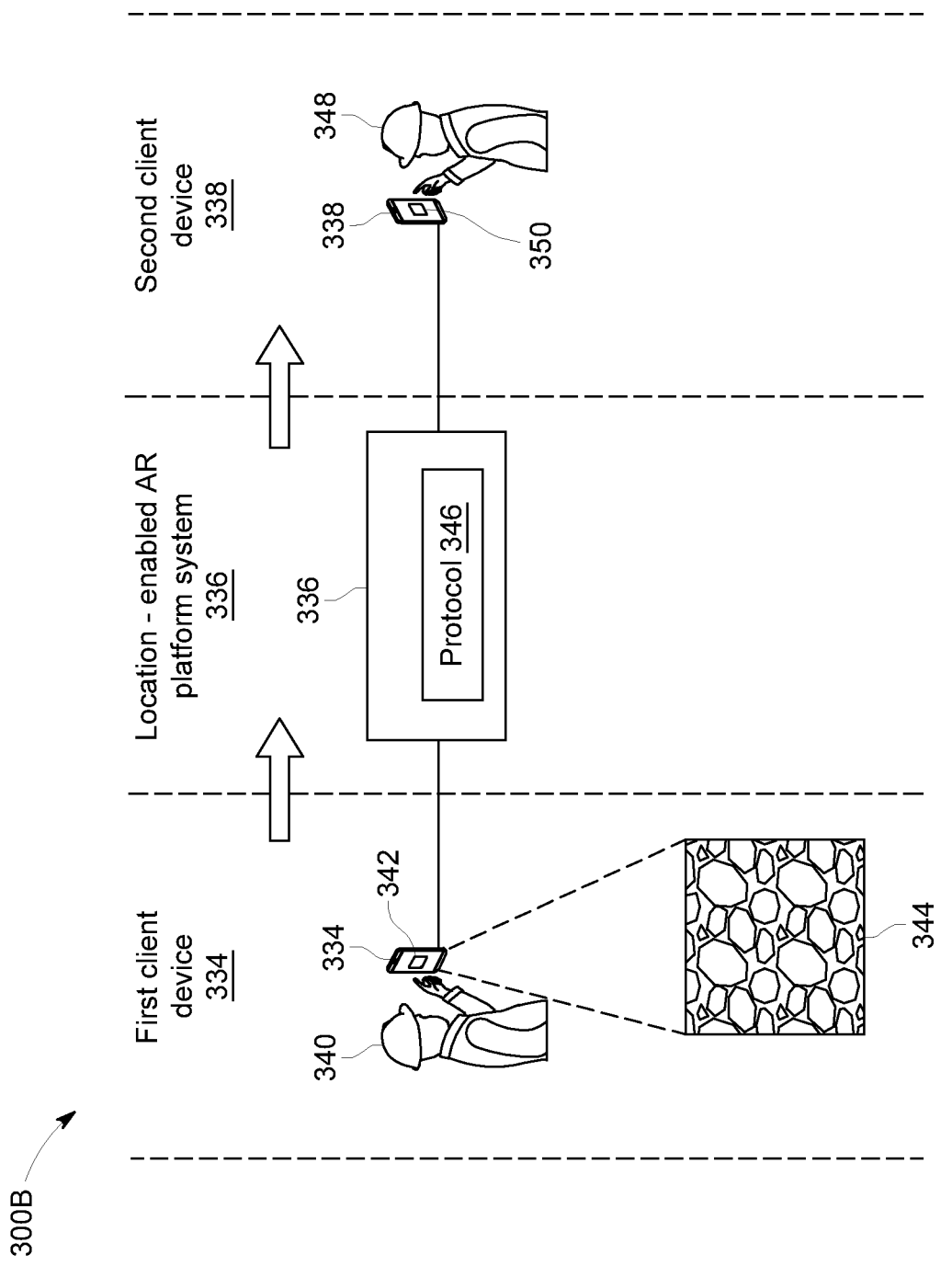
FIG. 3B illustrates a second exemplary scenario for implementation of the system and method to provide a platform for interoperability of augmented reality (AR) applications, in accordance with one embodiment.
Figure 3C:
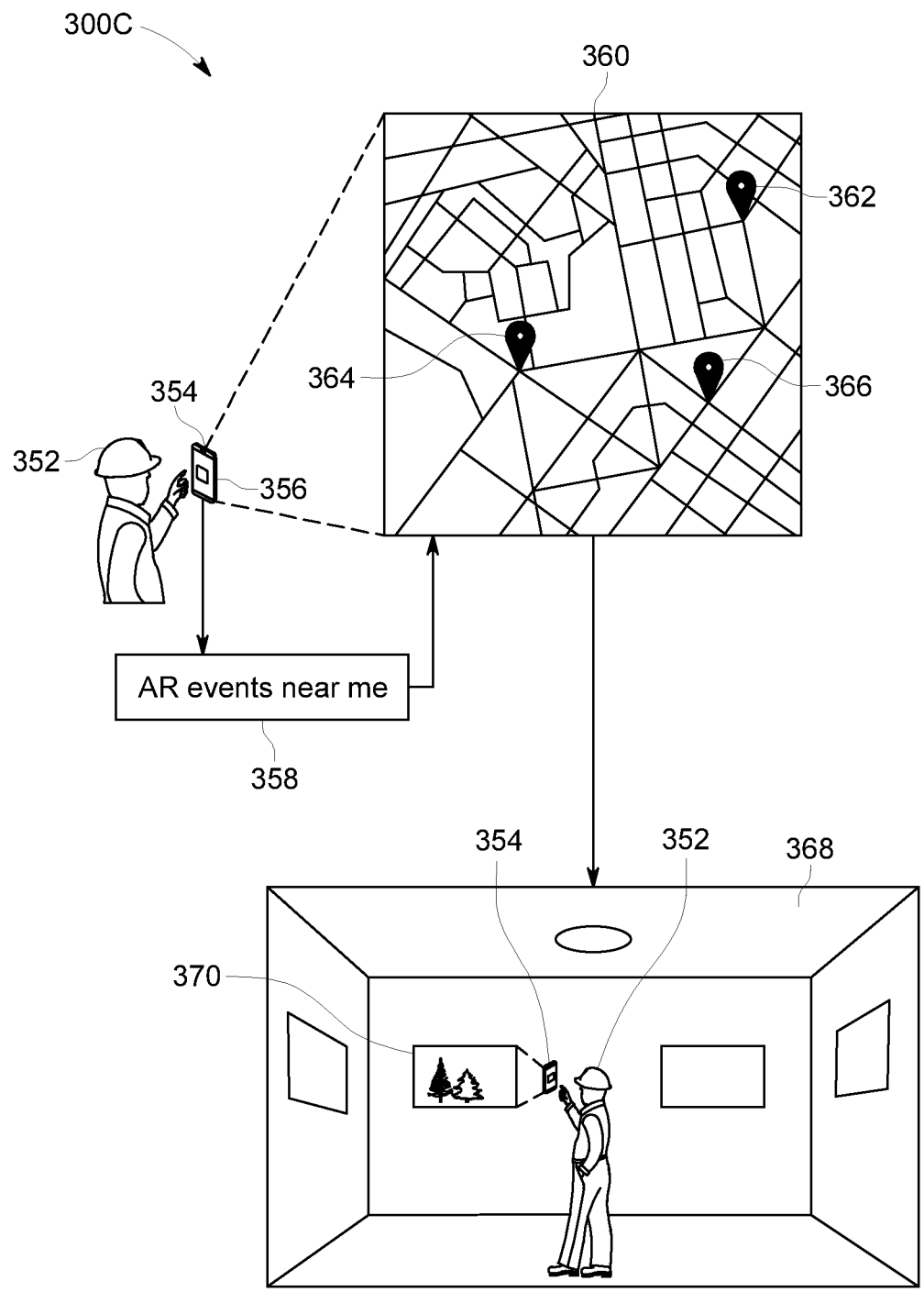
FIG. 3C illustrates a third exemplary scenario for implementation of the system and method to provide a platform for interoperability of augmented reality (AR) applications, in accordance with one embodiment.

FIGS. 3A to 3C, illustrate different exemplary scenarios for implementation of the system and method for providing interoperability amongst augmented reality (AR) applications, in accordance with an embodiment of the disclosure.

FIG. 3A illustrates a first exemplary scenario for implementation of the system and method to provide a platform for interoperability of augmented reality (AR) applications, in accordance with an embodiment of the disclosure. FIG. 3A is explained in conjunction with elements from FIG. 1 and FIG. 2. With reference to FIG. 3A, there is shown a smartphone 302, a first AR application 304, a second AR application 306, a user 308 associated with the smartphone 302, a real field of view of a room 310, a first augmented view of the room 312 and a second augmented view of the room 314. The real field of view of the room 310 shows a wall 316, an artefact (lamp) 318 and a floor 320. The first augmented view of the room 312 shows a first augmented object (a couch) 322. The first AR application 304 shows three models of a couch, viz., 322, 324 and 326 in a user interface screen when the first application may be operated on by the user 308. Similarly, the second AR application 306 shows three textures of a wall, viz., 328, 330 and 332. The second augmented view of the room 314 shows a second augmented object (a texture 328) on the wall 316 and the first augmented object (the couch) 322.

In accordance with the exemplary scenario, a house may be decorated with beautiful furniture and wall textures. However, a wrong choice of couch or a wrong choice of wall texture may spoil the looks and aesthetic appearance of the house. With AR technology, a user, such as the user 308 may anticipate right design choices before spending whopping amounts on the furniture and wall textures. With the help of the first AR application 304 and the second AR application 306, the user 308 may use augmented reality to see potential couch and wall texture in the home and save a whole lot of consternation in decoration of the house. In fact, the present invention aids in effective decision making by allowing manipulation of data of the first AR application 304 by the second AR application 306. The user 308 may virtually place a plurality of products into the house. The user 308 may place chairs, desks, and just about anything else in the kitchen, backyard, on the street, just to see how the furniture looks like.

The first AR application 304 may help the user 308 to precisely see how a couch may look in a particular corner of the house. The particular corner of the house may be represented by field of view 310. The field of view 310 may be captured by an image capture device installed inside the smartphone 302. The user 308 may scan the floor 320 of a room. Further, the user 308 may browse a list of products available in the first AR application 304. The first AR application 304 may offer three models of a couch, namely 322, 324 and 326. The user 308 may select the couch 322 from the three models of the couch to place in the particular corner of the house. The first AR application 304 may deploy the augmented object, namely the couch 322 from three models of the couch 322, 324 and 326 over the captured field of view of the particular corner of the house. The first AR application 304 may automatically scale products based on dimensions of a room. An overlay of augmented object, namely the couch 322 may be executed simultaneously with an input received from the image capture device of the smartphone 302. The first AR application 304 may superimpose virtual images over real-world objects may create an illusion to engage the user 308 in a virtual world.

The second AR application 306 may help the user 308 to precisely see how a particular texture of the wall 316 goes along with the couch selected for the particular corner of the house. The second AR application 306 may have to for example interact with the first AR application 304 in the smartphone 302 to engage the user 308 to see the couch selection and wall texture selection for the particular corner of the house. The first AR application 304 and the second AR application 306 may communicate with the cloud server 106 to receive different augmented objects for their respective AR applications. The augmented objects may be the data points in an AR space that are location centric. Therefore, such location centric augmented objects may be discovered and accessed via the location-enabled AR platform system 102. The location-enabled AR platform system 102 may be considered as a connection point amongst the plurality of AR applications.

The processor 202 of the location-enabled AR platform system 102 may be configured to provide a protocol for communication between the first AR application 304 and the second AR application 306. The protocol for communication may correspond to an API or interoperability specification between the first AR application and the second AR application. The protocol for communication may be provided by the processor 202 such that the first AR application 304 and the second AR application 306 may interact and exchange data in real time or near real time.

The processor 202 of the location-enabled AR platform system 102 may be configured to receive, from the first AR application 304, a first set of functionalities of a plurality of functionalities for exposure, based on the provided protocol. The first set of functionalities of a plurality of functionalities from the first AR application 304 may be available on the location-enabled AR platform system 102 when a developer associated with the first AR application 304 host the first AR application 304 on the location-enabled AR platform system 102. The first set of functionalities may include data related to the AR object (the couch 322). The first AR application 304 may expose the functionalities, such as color, size, and fabric associated with the AR objects (such as, the couch 322, the couch 324 and the couch 326) on the location-enabled AR platform system 102. The exposed functionalities of the first AR application 304 may be used by a plurality of AR applications. The use may be in terms of manipulation of attributes of the augmented object in the first AR application 304, data sharing, and exchange of data. The functionalities of the first AR application 304 may be exposed only when the plurality of AR applications, such as the second AR application 306 are authenticated by the location-enabled AR platform system 102.

The processor 202 may be configured to receive one or more queries from the second AR application 306 for exposed interface with the first AR application 304, based on the protocol for communication. The first set of functionalities of the first AR application 304 may be exposed for an interface with the second AR application 306. The processor 202 may be configured to receive one or more queries from the second AR application 306 for communication policy with the first AR application 304, based on the protocol for communication. The communication policy may include one or more of no data sharing, data only sharing, and data with Application Program Interface (API) functions available, data exchange available, Advertisement display with application Program Interface (API).

The processor 202 may be configured to authenticate an exchange of data between the first AR application 304 and the second AR application 306, based on the provided protocol for communication. In accordance with an embodiment, the first AR application 304 may communicate directly with the second AR application 306 via the cloud server 106, based on the authentication of the communication protocol. The processor 202 may be further configured to provide a current state of the first AR application 304 to the second AR application 306 based on the provided protocol for communication. The current state of the first AR application 304 may include one of active state, sleep state, shutdown state, or authentication required state. The processor 202 may be configured to provide a mode for data broadcast between the first AR application 304 and the second AR application 306.

The processor 202 may be configured to provide an accessibility of the received first set of functionalities of the first AR application 304 to the second AR application 306. The user 308 may change the first set of functionalities of the sec first AR application 304 through the second AR application 306. The processor 202 may be configured to control the second AR application 306 to manipulate the augmented object (the couch 322) of the first AR application 304, based on the accessibility of the received first set of functionalities. The manipulation of the augmented object (the couch 322) may correspond to change of an attribute value of the augmented object (the couch 322). The attribute may correspond to shape, size, and color of the AR object.

Further, the processor 202 may be configured to control the second AR application 306 to change the wall texture to second type, that is, the wall texture 328 from the three types of wall textures 328, 330 and 332. In accordance with an embodiment, the user 308 may see the changed size of the augmented couch 322 with wall texture 328 on the first AR application 304. The changed size of the augmented couch 322 may be manipulated by the second AR application 306 on the first AR application 304. Alternatively, the user 308 may see the changed size of the augmented couch 322 with the wall texture 328 on the second AR application 306. The processor 202 may be configured to control the second AR application 306 to share data related to different augmented objects of the first AR application 304. In accordance with an embodiment, the first AR application 304 and the second AR application 306 may be installed in two different smartphones. The first AR application 304 and the second AR application 306 may communicate with each other via the communication network 110. The user 308 may experience and experiment with furniture (couch) and wall texture from respective retailers.

FIG. 3B illustrates the system and method for providing a platform for interoperability of augmented reality (AR) applications, in accordance with an embodiment of the disclosure. FIG. 3B is explained in conjunction with elements from FIG. 1, FIG. 2 and FIG. 3A. With reference to FIG. 3B, there is shown a first client device 334, a location-enabled AR platform system 336 and a second client device 338. A first user 340 is associated with the first client device 334. There is further shown a first AR application 342, an AR artwork 344, a protocol 346 for communication between AR applications, a second user 348 associated with the second client device 338 and a second AR application 350.

The first AR application 342 may be installed in the first client device 334. The second AR application 350 may be installed in the second client device 338. The first user 340 may be associated with the first AR application 342 of the first client device 334. The second user 348 may be associated with the second AR application 350 of the second client device 338. The location-enabled AR platform system 336 may be configured to provide interoperability of the first AR application 342 and the second AR application 350.

In accordance with an embodiment, the user 340 may design three dimensional (3D) arts in different locations of a city with the help of the first AR application 342 associated with the first client device 334. The user 340 may be an artist who designs the 3D arts for a living. The location-enabled AR platform system 102 may provide a platform for a number of users, such as the first user 340 to publish the data related to the 3D artwork for public or third party access. The location-enabled AR platform system 102 may be an AR marketplace for people to buy 3D artwork.

The second user 348 may be an AR application developer who may want to access the data, such as the artwork 344 associated with the first AR application 342 of the second user 340. The second user 348 may want an option to integrate the artwork 344 in the second AR application 350. Such integration of the artwork 344 from the first AR application 342 to the second AR application 350 may enable the second user 348 to view a new look of the artwork 344 by adding additional effects for the clients of the second user 348.

The integration of the artwork 344 from the first AR application 342 to the second AR application 350 may be possible when the first user 340 hosts the first AR application 342 on the location-enabled AR platform system 102 with exposure to a set of functionalities from the plurality of AR functionalities associated with the first AR application 342.

The processor 202 of the location-enabled AR platform system 102 may be configured to provide a protocol for communication between the first AR application 342 and the second AR application 350. The protocol for communication and authentication has been explained in detail in FIG. 3A.

In accordance with an embodiment, the first AR application 342 and the second AR application 350 may exchange data related to the respective artworks. Therefore, the second AR application 350 may manipulate the artwork 344 of the second AR application 350 based on the exposed interface of the first AR application 342.

In accordance with an embodiment, the first AR application 342 may communicate directly with the second AR application 350 via the cloud server 106, based on the authentication of the communication protocol by the location-enabled AR platform system 102. In accordance with an embodiment, mixed reality applications that may combine virtual reality (VR) and augmented reality (AR) may be configured to fetch data from the location-enabled AR platform system 102 for artworks, such as the artwork 344 to enrich their applications, like Game applications or VR applications. The location-enabled AR platform system 102 may be configured to integrate secure e-commerce environment to monetize data, products, services or applications brought from external world to location-enabled AR platform system 102.

FIG. 3C illustrates the system and method for providing a platform for interoperability of augmented reality (AR) applications, in accordance with an embodiment of the disclosure. FIG. 3C is explained in conjunction with elements from FIG. 1, FIG. 2, FIG. 3A and FIG. 3B. With reference to FIG. 3C, there is shown a user 352, a smartphone 354, an AR event browser application 356, a query from the user 352 about AR events near me 358, the map with AR events 360, a first location 362, a second location 364 and a third location 366 for AR events near the location of the user 352, a museum 368, a plurality of wall arts, such as an art frame 370.

In accordance with an exemplary embodiment, the AR event browser application 356 may be configured to receive a search query from the user 352 through a user interface element for the AR events happening near the location of the user 352 in real time or near real time. The AR event browser application 356 may be configured to transmit the search query to the location-enabled AR platform system 102 to search the AR events near the user 352 in real time or near real time. However, the information associated with the AR events near the user 352 may be displayed based on the location data shared by the AR events near the user 352, via the location-enabled AR platform system 102.

The user 352 may browse the map 360 of a city through the AR event browser application 356 to discover all kinds of augmented reality objects and reality events that may be currently happening. Since the AR event browser application 356 may be integrated, the location based discovery and search for AR activities may be possible. A street art may be happening at the first location 362, a gaming zone at the second location 364 and an art exhibition at the third location 366.

The location-enabled AR platform system 102 may act as a platform for AR applications eco-system or market place. The location-enabled AR platform system 102 may act as an infrastructure and AR market place to connect maps, location data, and location services. The location-enabled AR platform system 102 may enable developers, data consumers and data producers for an AR experience.

The user 352 may choose to visit the art exhibition in the third location 366 where the museum 368 may be situated. These days, museums make efforts to explore different ways to better connect with the public. The user 352 may experience a rich view of the artwork 370 through a special layer of the augmented reality browser by use of the smartphone 352. The user 352 may be able to an extra layer of digital content on top of a real-world scenario. The augmented reality browser may be installed on a smartphone 354 for the user 352 to look at the museum through built in camera of the smartphone 354. The GPS location system and internet connection through the smartphone 354 may allow the virtual art to be projected over the top of the camera's image of the art work 370 in museum space. The processor 202 of the location-enabled AR platform system 102 may control the smartphone to explore the art in a visceral way. With the help of the location-enabled AR platform system 102 an AR experience may be created for the user 352 that complements the original artists' work and enables the user 352 to feel like they have the art in their hands.

Figure 4:
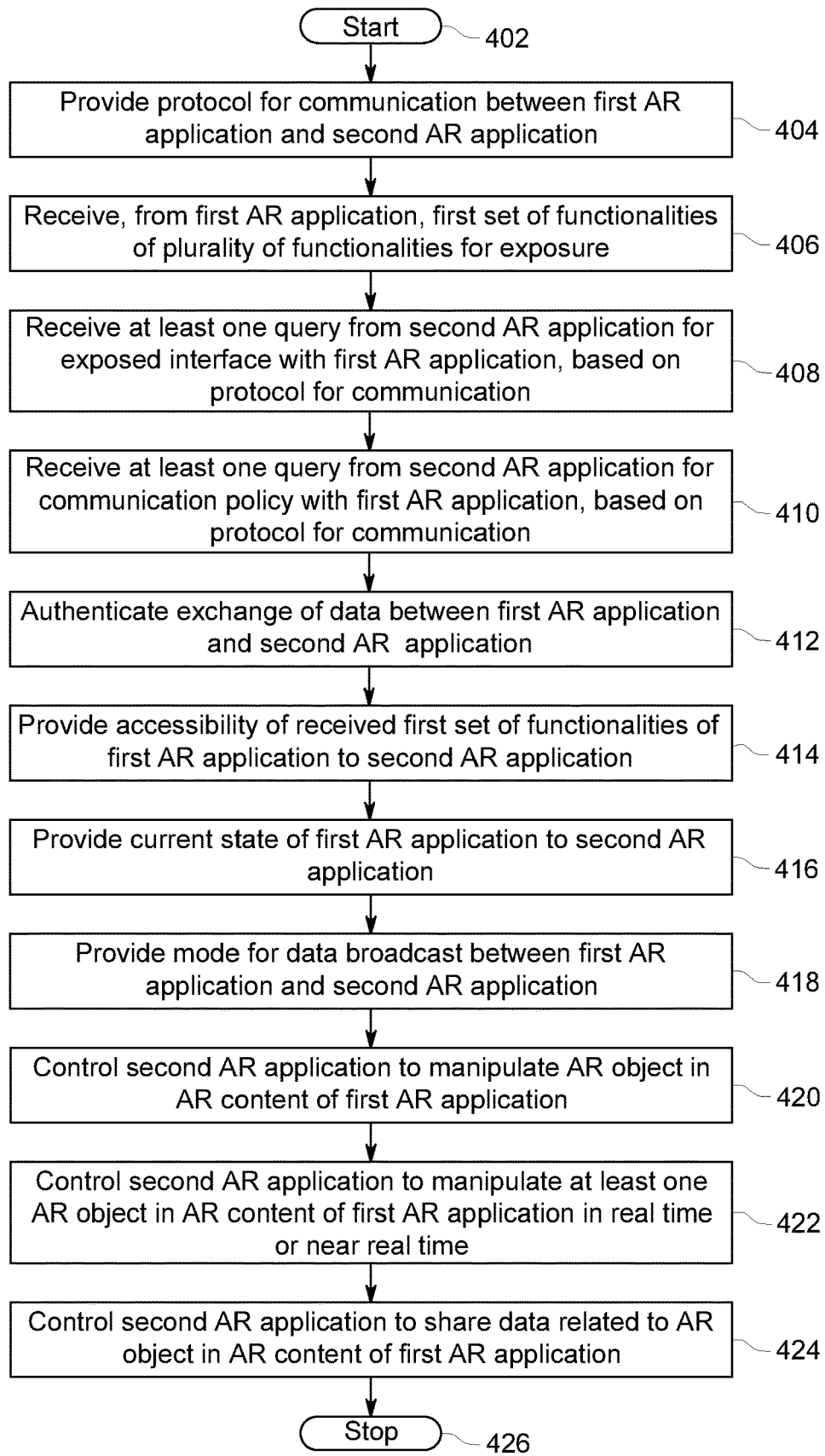
FIG. 4 is a flow chart that shows a processing pipeline for implementation of an exemplary method to provide a platform for interoperability of augmented reality (AR) applications, in accordance with one embodiment.

FIG. 4 illustrates a flowchart for implementation of an exemplary method for providing a platform for interoperability of augmented reality (AR) applications, in accordance with an embodiment of the disclosure. With reference to FIG. 4, there is shown a flowchart 400. The flowchart 400 is described in conjunction with elements from FIGS. 1, 2, 3A, 3B and 3C. The method, in accordance with the flowchart 400, may be implemented in the location-enabled AR platform system 102. The method starts at 402 and proceeds to 404.

At 404, a protocol for communication may be provided between a first AR application and a second AR application. The processor 202 may be configured to provide a protocol for communication between a first AR application and a second AR application. The protocol for communication may correspond to an API or interoperability specification between the first AR application and the second AR application.

At 406, a first set of functionalities of a plurality of functionalities may be received from the first AR application for exposure, based on the provided protocol. The processor 202 may be configured to receive, from the first AR application, a first set of functionalities of a plurality of functionalities for exposure, based on the provided protocol. The first set of functionalities may include data related to at least one AR object in AR content of the first AR application.

At 408, at least one query may be received from the second AR application for exposed interface with the first AR application. The processor 202 may be configured to receive at least one query from the second AR application for exposed interface with the first AR application, based on the protocol for communication. The first set of functionalities of the first AR application may be exposed for an interface with the second AR application.

At 410, at least one query may be received from the second AR application for communication policy with the first AR application. The processor 202 may be configured to receive at least one query from the second AR application for communication policy with the first AR application, based on the protocol for communication. Communication policy may include one or more of no data sharing, data only sharing, data with Application Program Interface (API) functions available, data exchange available, Advertisement display with application Program Interface (API).

At 412, an exchange of data may be authenticated between the first AR application and the second AR application. The processor 202 may be configured to authenticate an exchange of data between the first AR application and the second AR application, based on the provided protocol for communication. The first AR application may communicate directly with the second AR application via a cloud server, based on the authentication of the communication protocol.

At 414, an accessibility of the received first set of functionalities of the first AR application may be provided to the second AR application. The processor 202 may be configured to provide an accessibility of the received first set of functionalities of the first AR application to the second AR application.

At 416, a current state of the first AR application may be provided to the second AR application. The processor 202 may be configured to provide a current state of the first AR application to the second AR application based on the provided protocol for communication. The current state of the first AR application may include one of active state, sleep state, shutdown state, or authentication required state.

At 418, a mode for data broadcast may be provided between the first AR application and the second AR application. The processor 202 may be configured to provide a mode for data broadcast between the first AR application and the second AR application, based on the provided protocol for communication.

At 420, the second AR application may be controlled to manipulate the at least one AR object in the AR content of the first AR application The processor 202 may be configured to control the second AR application to manipulate the at least one AR object in the AR content of the first AR application, based on the accessibility of the received first set of functionalities. The manipulation of the at least one AR object may correspond to change of an attribute value of the at least one AR object. The attribute may correspond to shape, size, color of the AR object.

At 422, the second AR application may be controlled to manipulate the at least one AR object in the AR content of the first AR application in real time or near real time. The processor 202 may be configured to control the second AR application to manipulate the at least one AR object in the AR content of the first AR application in real time or near real time.

At 424, the second AR application may be controlled to share data related to the at least one AR object in the AR content of the first AR application. The processor 202 may be configured to control the second AR application to share data related to the at least one AR object in the AR content of the first AR application. The control passes to an end at 426.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

I claim:

1. A location-enabled augmented reality (AR) platform system, comprising:
   at least one memory configured to store instructions; and
   at least one processor configured to execute the instructions to:
      provide a protocol for communication between a first AR application and a second AR application;
      receive, from the first AR application, a first set of functionalities of a plurality of functionalities for exposure, based on the provided protocol, wherein the first set of functionalities includes data related to at least one AR object in AR content of the first AR application;

provide an accessibility of the received first set of functionalities of the first AR application to the second AR application; and control the second AR application such that the second AR application manipulates the at least one AR object in the AR content of the first AR application, based on the accessibility of the received first set of functionalities, wherein the manipulation of the at least one AR object corresponds to change of an attribute value of the at least one AR object.

2. The location-enabled augmented reality (AR) platform system of claim 1, wherein the at least one processor is further configured to control the second AR application such that the second AR application manipulates the at least one AR object in the AR content of the first AR application in real time or near real time.

3. The location-enabled augmented reality (AR) platform system of claim 1, wherein the at least one processor is further configured to control the second AR application such that the second AR application shares data related to the at least one AR object in the AR content of the first AR application.

4. The location-enabled augmented reality (AR) platform system of claim 3, wherein the at least one processor is further configured to control the first AR application and the second AR application such that the first AR application and the second AR application share data, based on the protocol for communication between the first AR application and the second AR application.

5. The location-enabled augmented reality (AR) platform system of claim 1, wherein the first set of functionalities includes data, functions and features related to the at least one AR object in the AR content of the first AR application.

6. The location-enabled augmented reality (AR) platform system of claim 1, wherein the at least one processor is further configured to receive at least one query from the second AR application for exposed interface with the first AR application, based on the protocol for communication, and wherein the first set of functionalities of the first AR application is exposed for an interface with the second AR application.

7. The location-enabled augmented reality (AR) platform system of claim 1, wherein the at least one processor is further configured to receive at least one query from the second AR application for communication policy with the first AR application, based on the protocol for communication.

8. The location-enabled augmented reality (AR) platform system of claim 7, wherein the communication policy includes one or more of no data sharing, data only sharing, data with Application Program Interface (API) functions available, data exchange available, Advertisement display with application Program Interface (API).

9. The location-enabled augmented reality (AR) platform system of claim 1, wherein the at least one processor is further configured to provide a current state of the first AR application to the second AR application based on the provided protocol for communication, wherein the current state of the first AR application comprises one of active state, sleep state, shutdown state, or authentication required state.

10. The location-enabled augmented reality (AR) platform system of claim 1, wherein the at least one processor is further configured to provide a mode for data broadcast between the first AR application and the second AR application, based on the provided protocol for communication.

11. The location-enabled augmented reality (AR) platform system of claim 1, wherein the at least one processor is further configured to authenticate an exchange of data between the first AR application and the second AR application, based on the provided protocol for communication.

12. The location-enabled augmented reality (AR) platform system of claim 11, wherein the first AR application communicates directly with the second AR application via a cloud server, based on the authentication of the communication protocol.

13. The location-enabled augmented reality (AR) platform system of claim 1, wherein the AR application comprises a mixed reality application that combines virtual reality and augmented reality.

14. A method for providing a platform for interoperability of augmented reality (AR) applications, comprising:
providing a protocol for communication between a first AR application and a second AR application;
receiving, from the first AR application, a first set of functionalities of a plurality of functionalities for exposure, based on the provided protocol, wherein the first set of functionalities includes data related to at least one AR object in AR content of the first AR application;
providing an accessibility of the received first set of functionalities of the first AR application to the second AR application; and
controlling the second AR application such that the second AR application manipulates the at least one AR object in the AR content of the first AR application, based on the accessibility of the received first set of functionalities, wherein the manipulation of the at least one AR object corresponds to change of an attribute value of the at least one AR object.

15. The method of claim 14, further comprising controlling the second AR application such that the second AR application manipulates the at least one AR object in the AR content of the first AR application in real time or near real time.

16. The method of claim 14, further comprising controlling the second AR application such that the second AR application shares data related to the at least one AR object in the AR content of the first AR application.

17. The method of claim 16, further comprising controlling the first AR application and the second AR application such that the first AR application and the second AR application share data, based on the protocol for communication between the first AR application and the second AR application.

18. The method of claim 14, wherein the first set of functionalities includes data, functions and features related to the at least one AR object in the AR content of the first AR application.

19. The method of claim 14, further comprising receiving at least one query from the second AR application for communication policy with the first AR application, based on the protocol for communication, wherein the communication policy includes one or more of no data sharing, data only sharing, data with Application Program Interface (API) functions available, data exchange available, Advertisement display with application Program Interface (API).

20. A computer program product comprising at least one non-transitory computer-readable storage medium having stored thereon computer-executable program code instructions which when executed by a computer, cause the computer to carry out operations for providing a platform for interoperability of augmented reality (AR) applications, the operations comprising:

providing a protocol for communication between a first AR application and a second AR application;

receiving, from the first AR application, a first set of functionalities of a plurality of functionalities for exposure, based on the provided protocol, wherein the first set of functionalities includes data related to at least one AR object in AR content of the first AR application;

providing an accessibility of the received first set of functionalities of the first AR application to the second AR application; and controlling the second AR application such that the second AR application manipulates the at least one AR object in the AR content of the first AR application, based on the accessibility of the received first set of functionalities, wherein the manipulation of the at least one AR object corresponds to change of an attribute value of the at least one AR object.

* * * * *